LOCKING AND EXTRACTING MEANS FOR CAN-ENCLOSED UNITS

Filed June 26, 1961 3 Sheets-Sheet 1

INVENTORS
EWALD BAUSCH
ROBERT WIGHTON
BY Wade Koontz
Louis E. Bay
ATTORNEYS

Aug. 20, 1963 E. BAUSCH ETAL 3,101,230

LOCKING AND EXTRACTING MEANS FOR CAN-ENCLOSED UNITS

Filed June 26, 1961 3 Sheets-Sheet 2

INVENTORS
EWALD BAUSCH
ROBERT WIGHTON

BY Wade Koontz
Louis E. Hay
ATTORNEYS

LOCKING AND EXTRACTING MEANS FOR CAN-ENCLOSED UNITS

Filed June 26, 1961 3 Sheets-Sheet 3

INVENTORS
EWALD BAUSCH
ROBERT WIGHTON
BY Wade Koontz and Louis E. Fay
ATTORNEYS 3,101,230

LOCKING AND EXTRACTING MEANS FOR CAN-ENCLOSED UNITS

Ewald Bausch, Morristown, and Robert Wighton, Morris Plains, N.J., assignors, by mesne assignments, to the United States of America as represented by the Secretary of the Air Force Filed June 26, 1961, Ser. No. 119,752
7 Claims. (Cl. 339—91)

This invention relates to electrical apparatus of the type wherein a multiplicity of electrical elements are packaged or housed into a unit structure or canister and are then connected into the system by means of multiple pins which enter and make sliding engagement with suitable sockets.

It is well known that in non-stationary applications, or applications wherein such unit structures are subjected to vibration, shock, rapid acceleration and deceleration, as well as other external forces, great difficulty is encountered in maintaining proper mechanical and electrical connection of electrical elements which in this application shall be construed to include electrical components, electro-mechanical components, and printed circuits.

The problem of maintaining proper mechanical and electrical connection is extremely critical when such electrical apparatus is carried on board aircraft and other space vehicles subject to severe vibrations and great maneuverability at supersonic speeds.

In common with all apparatus carried on board space vehicles, the design criteria for the electrical apparatus include light weight, smallest practicable physical dimensions, compactness in the assembly of subcomponents and functional reliability.

In order to secure functional reliability of the electrical apparatus, unit structures or canisters of the type to which the present invention pertains must be latched in place to assure mechanical and electrical connection.

Latching devices used in the past to prevent loss of mechanical or electrical connection have been of complex design and have not been wholly suitable for the severe conditions encountered on space vehicles. Such latching devices have also greatly added to the physical size of the units to which attached, and have also limited the proximity of adjacent units since enough space had to be maintained between adjacent units to permit entry of the hands for the purpose of actuating the latch releases.

Hinged hold-down devices in lieu of latch devices have also been used in the past. Such devices will allow the unit structures to be mounted in close proximity with each other. However, the use of such hinged hold-down devices adds to the weight of the apparatus and also necessitates the use of a special tool for removal of the unit structures from the electrical apparatus. Furthermore, a different size tool is required for each size unit structure, thereby contributing to the cost and confusion of the service problem.

The primary object of this invention is to provide a simple fail-resistant latch suitable for use in the environment encountered by space vehicles.

Another object of the invention is to incorporate on each unit structure, a handle suitable for the insertion or removal of a unit structure from the electrical apparatus and with the same unilateral motion to actuate the latch.

Another object of the invention is to minimize the space required between adjacent units on multi-unit installations, thereby permitting optimum compactness.

More objects of novelty and utility will be apparent from the following description and drawings in which like parts are designated by like numerals.

Figure 1:
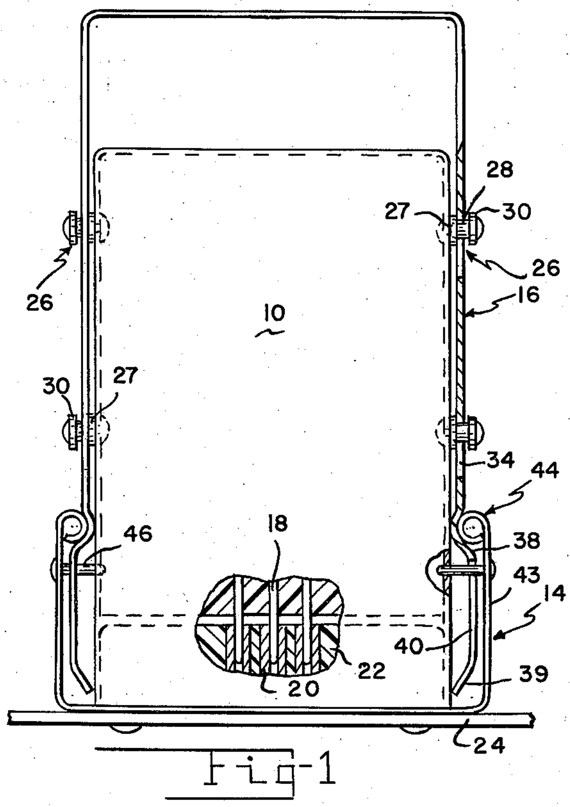
FIG. 1 is a front elevation of a canister with attached operating handle, connected with and latched in place on an apparatus, partially in section to show electrical connections and latching means.

Referring to FIG. 1, the preferred embodiment of the invention is illustrated in connection with a housing or canister 10 designed to house or encapsulate one or more electrical elements such as relays or printed circuits which elements are then mechanically and electrically connected into an electrical system by means of terminal pins 18 which engage suitable sockets 20 in a mounting pad or base member 22. The electrical elements housed in housing 10, the manner of connecting the electrical elements into the electrical system and the manner of guiding housing 10 to encompass base member 22 are all well known to the art and form no part of this invention. Base member 22 is mounted to the panel member 24 of an electrical apparatus by any of the suitable methods well known to the art and forms no part of this invention.

Figure 2:
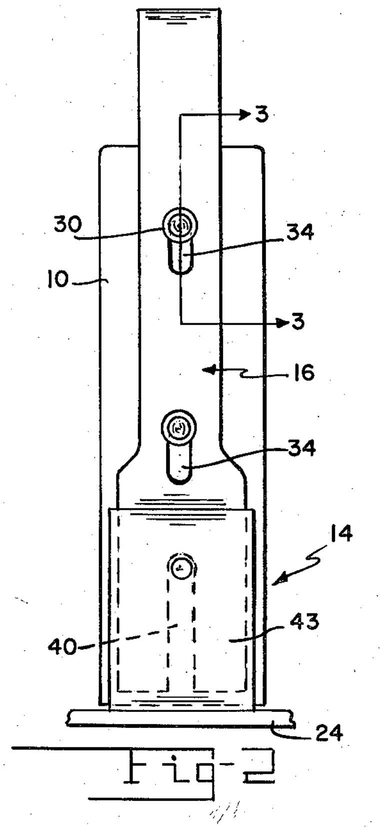
FIG. 2 is a side elevation, similar to FIG. 1.
Figure 5:
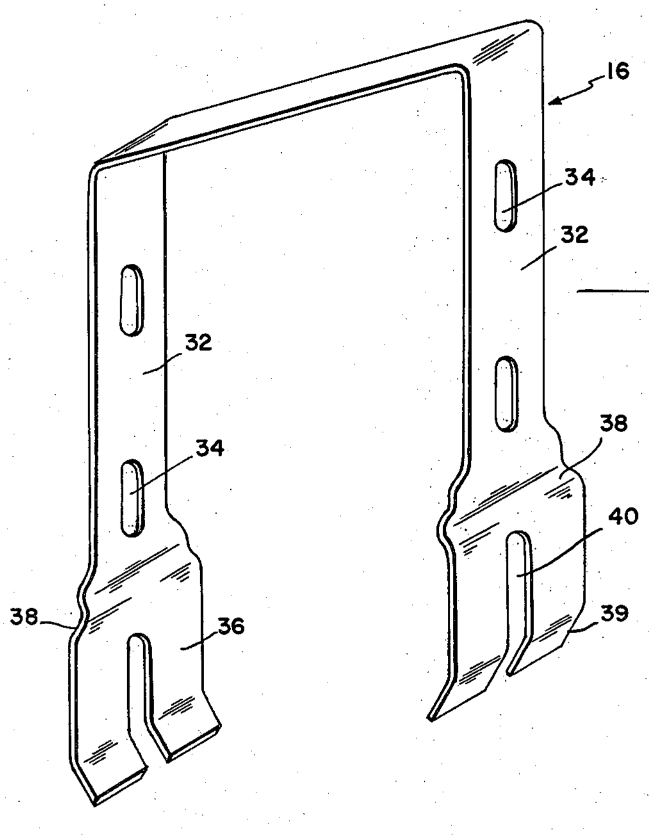
FIG. 5 is a perspective of the operating handle.

Operating handle 16 is formed to substantially the shape depicted by FIG. 5 and is slideably attached to opposing flat and parallel sides of housing 10 at its approximate longitudinal center line as depicted by FIG. 2 by means of shoulder rivets 26. The operating handle 16 is preferably formed from flat spring stock such as stainless steel or Phosphor bronze in order to maintain structural rigidity while at the same time having yieldability to permit springing over the shoulder rivets 26 when joined to housing 10.

Figure 3:
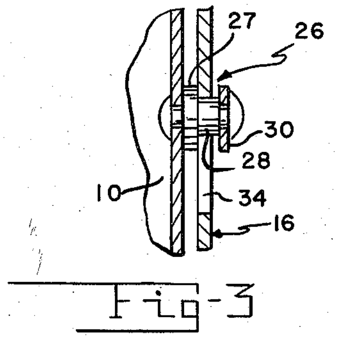
FIG. 3 is a section on line 3—3 of FIG. 2 showing construction of shoulder rivet.

Shoulder rivet 26 may be joined with housing 10 by riveting as depicted by FIG. 3 or by other suitable means known to the art. Rivet 26 has a shoulder diameter 27 to stiffen or reinforce the connection between rivet 26 and housing 10 and also to act as a spacer between operating handle 16 and housing 10. Rivet 26 is provided with circular guide portion 28 of such length as to be silghtly longer than the metal thickness of operating handle 16 and engages elongated slot 34 of handle 16. Washer 30 of any convenient diameter greater than the diameter of guide portion 28 may be riveted to shoulder rivet 26 as shown. It is thus seen that after guide rivets 26 are joined with housing 10, operating handle 16 may be sprung to allow rivets 26 to engage the elongated slots 34 of the operating handle, after which washers 30 may be riveted in place to thereby permanently install the operating handle 16 to housing 10.

Operating handle 16 is formed substantially as shown by FIG. 5 to provide a U-shaped structure with opposing side members spaced to provide a free fit when installed in its operating position on shoulder rivets 26 and of sufficient length to permit easy finger entry between the bight of handle 16 and housing 10. Elongated slots 34 are formed in side members 32 of such width as to provide a free fit on the guide portion 28 of shoulder rivets 26 and of such length as necessary to permit operation of the spring latching means 14. Side members 32 terminate in fork-like elements 36, each of which has cam surface 38 and cam surface 39 which actuate the spring latching means 14. Fork-like elements 36 each has a slot 40 into which lock pins 46 on the spring latching means may enter.

Figure 6:
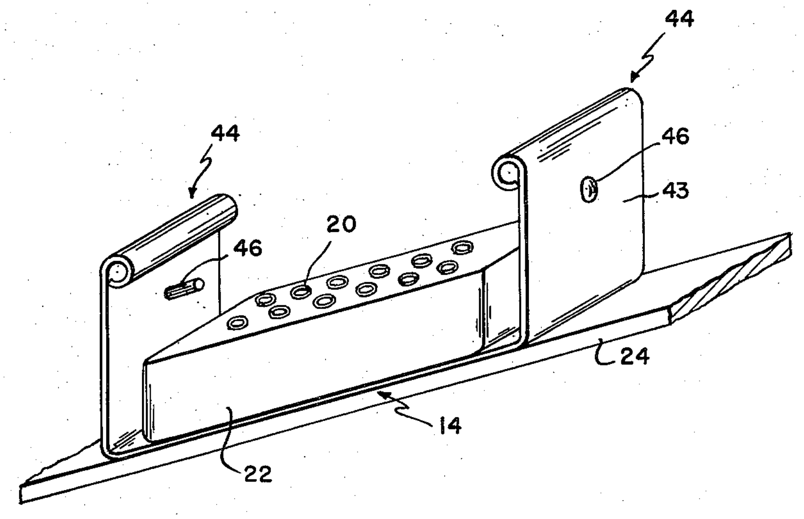
FIG. 6 is a perspective of the latching means mounted in place.

Spring latching means 14 is formed to substantially the shape depicted by FIG. 6 and is mounted between base member 22 and panel member 24 by any convenient method well known to the art. Holes are provided for the passage of terminal wires from sockets 20. These holes are not shown and form no part of this invention. The spring latching means is preferably formed from light gauge flat spring stock such as stainless steel or Phosphor bronze in order to maintain structural stability while having some yieldability. The latching means 14 has opposing side members 43 which terminate in rolled ends 44 which are acted upon by cam surfaces 38 and cam surfaces 39 of handle 16 in such manner as to slightly spread side members 43. Latch pins 46 are riveted to opposing side members 43 and engage holes 42 in housing 10 when in the latched position. The opposing side members 43 are slightly biased toward each other in order to exert enough pressure to assure the engagement of pins 46 in holes 42 when housing 10 is in the connected or home position and operating handle 16 is fully pushed toward panel member 24 to permit rolled ends 44 to exert pressure against the low position of cam surfaces 38 as depicted by FIG. 1 to prevent the disconnection of housing 10.

Figure 4:
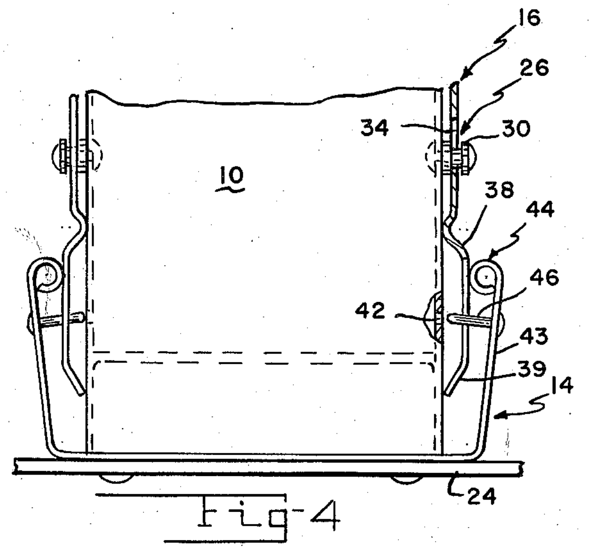
FIG. 4 is a front elevation similar to FIG. 1, partially in section to show the latching means in its unlatched position.

Referring to FIG. 4, in the operation of the device, lifting operating handle 16 away from panel member 24 until elongated slots 34 contact the bottom of shoulder rivets 26 will simultaneously spread the side members 43 of latching means 14 to disengage pins 46 from holes 42 of housing 10 thus permitting further lifting of operating handle 16 to disconnect housing 10 from base member 22.

Housing 10 may be connected and latched to base member 22 by directing the operating handle 16 toward the base member in such manner that cam surfaces 39 will engage with rolled ends 44 and spread latching means 14 to permit the free ends of latch pins 46 to clear the passage of housing 10 onto base member 22, being forced into its home position by engagement between the top of elongated slots 34 with the top of shoulder rivets 26, at which time latch pins 46 will enter holes 42 of housing 10 and secure same.

Figures 7, 8:
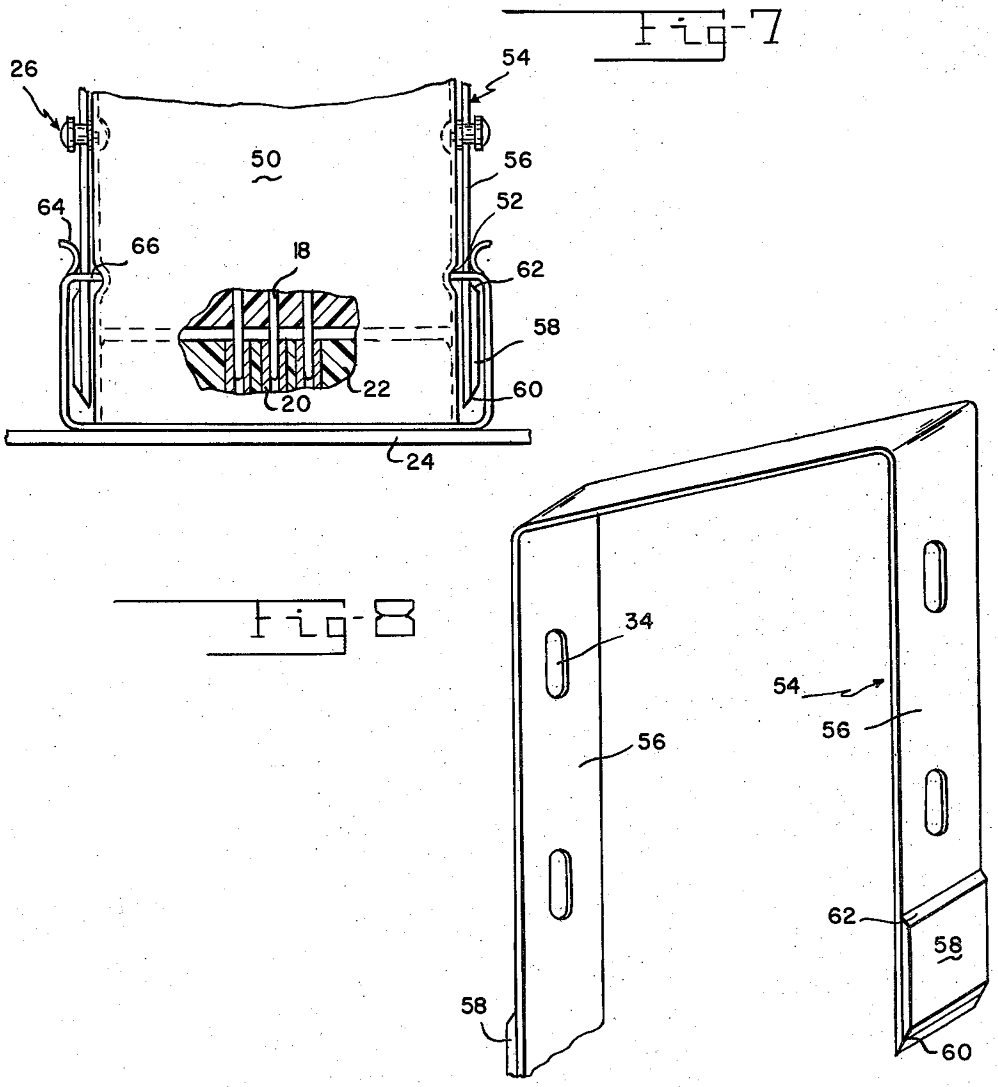
FIG. 7 is a front elevation showing another embodiment of the invention.
FIG. 8 is a perspective of the operating handle used with the embodiment shown in FIG. 7.

Referring to FIG. 7, housing 50 has inwardly drawn beads or detents 52 formed into opposing flat and parallel sides.

Referring to FIG. 8, operating handle 54 is formed substantially as shown with opposing side members 56. Spot welded or otherwise joined to the outside faces of the free ends of side members 56 are cam blocks 58. The ends of side members 56 and corresponding ends of cam blocks 58 are formed to bevel edges 60. Similar bevels 62 are formed on opposing edges of cam blocks 58.

Figure 9:
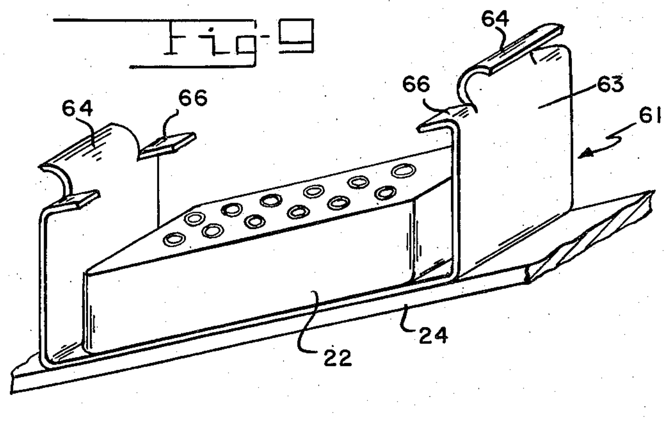
FIG. 9 is a perspective of the latching means mounted in place for the embodiment shown in FIG. 7.

Referring to FIG. 9, spring latching means 61 is formed to substantially the shape depicted with side members 63 which terminate in cam surfaces 64 and in tangs 66. Tangs 66 are formed at substantially 90° to side members 63 and so located to engage with detents 52 when housing 50 is in its home position and thereby secure housing 50. Tangs 66 on each side member 63 are so spaced that side edges adjacent to each other provide guides for the side members 56 of operating handles 54.

In operation, lifting operating handle 54 until the bottom of elongated slots 34 engage the bottom of shoulder rivets 26 will unlatch tangs 66 from detents 52 thereby permitting further lifting of operating handle 54 to disconnect housing 50 from base member 22.

Housing 50 may be connected and latched to base member 22 by directing the ends of operating handle 54 between the guides formed by tangs 66 which will also cause bevels 60 to bear on cam surfaces 64 to spread side members 63 of latching means 61 to permit entry of housing 50 onto base member 22, being forced into its home position by engagement between the top of elongated slots 34 with the top of shoulder rivets 26, at which time tangs 66 will enter detents 52 of housing 50 and secure same.

While the embodiments of this invention disclosed by the specification and drawings are in connection with electrical elements packaged into a canister or housing, it is obvious that the invention may be used with elements not packaged or mounted in this specific manner.

What is claimed is:

1. A device for removably mounting a hold-down or protective cover for electrical elements to a mounting pad on electrical apparatus and latching same in place comprising an open end housing member having at least two opposing side walls which are substantially flat and parallel, latching means consisting of a U-shaped member mounted between said mounting pad and a panel member of said electrical apparatus, said latching means having opposing side members extending away from said panel member for latching and securing said housing member to said mounting pad, means in the form of a U-shaped handle attached to opposing flat side walls of said housing member for inserting and removing said housing member, said handle having means thereon for operating said latching means to permit insertion and removal of said housing member.

2. A device for connecting and disconnecting a canister housing electrical elements having multiple pin connectors to and from a base member of an electrical apparatus and latching same in place comprising in combination a metal housing member having at least two opposing side walls which are substantially flat and parallel and enclosing said electrical elements, latching means consisting of a U-shaped member mounted between said base member and a panel member of said electrical apparatus, said latching means having opposing side members extending away from said panel member and biased for latching and securing said canister to said base member, means in the form of a U-shaped handle attached to opposing flat side walls of said housing member for inserting and removing said canister, said handle having opposing side members terminating with means thereon for opening said latching means to permit insertion and removal of said canister.

3. A device for connecting and disconnecting an electrical unit having multiple pin connectors to and from a base member of an electrical apparatus and latching same in place comprising in combination a metal housing member having at least two opposing side walls which are substantially flat and parallel and enclosing said electrical unit, latching means in the form of a U-shaped member mounted between said base member and a panel member of said electrical apparatus, said latching means having opposing side members extending away from said panel member and biased for latching and securing said housing member to said base member, means in the form of a U-shaped handle slidably attached to opposing flat side walls of said housing member for inserting and removing said electrical unit, said handle having opposing side members terminating with means thereon for opening said latching means to permit connecting of said electrical unit on said base member and for opening said latching means to permit removal of said electrical unit.

4. A device for connecting and disconnecting an electrical unit or canister having multiple pin connectors to and from a base member of an electrical apparatus and latching same in place comprising in combination a metal housing member having at least two opposing side walls which are substantially flat and parallel and enclosing said electrical unit, latching means in the form of a U-shaped spring member mounted between said base member and a panel member of said electrical apparatus, said latching means having opposing side members extending away from said panel member and biased for latching and securing said housing member to said base member, means in the form of a U-shaped handle slideable attached to said opposing flat side walls of said housing member for inserting and removing said housing member, said handle having opposing side members terminating with means thereon for opening said latching means to permit connecting of said housing member on said base member, and for opening said latching means to permit removal of said housing member, said latching means being actuated and said housing member being connected or removed by unilateral motion of said handle.

5. A device for connecting and disconnecting an electrical unit or canister having multiple pin connectors to and from a base member of an electrical apparatus and latching same in place comprising in combination a metal housing member having at least two opposing side walls which are substantially flat and parallel and enclosing said electrical unit, latching means in the form of a U-shaped spring member mounted between said base member and a panel member of said electrical apparatus, said latching means having opposing side members extending away from said panel member and biased for latching and securing said housing member to said base member by means of pins joined to said side members of said latching means, said pins engaging mating holes in said housing member, means in the form of a U-shaped handle slideably attached to said opposing flat side walls of said housing member for connecting and removing said housing member, said handle having opposing side members terminating with means thereon for opening said latching means to permit connecting of said housing member on said base member, and for opening said latching means to permit removal of said housing member, said latching means being actuated and said housing member being connected or removed by unilateral motion of said handle.

6. A device for connecting and disconnecting an electrical unit or canister having multiple pin connectors to and from a base member of an electrical apparatus and latching same in place comprising in combination a metal housing member having at least two opposing side walls which are substantially flat and parallel and enclosing said electrical unit, latching means in the form of a U-spaped spring member mounted between said base member and a panel member of said electrical apparatus, said latching means having opposing side members extending away from said panel member and terminating in tangs extending inwardly from said opposing side members which are biased for latching and securing said housing member by means of said tangs engaging inwardly drawn beads or detents in said housing member, means in the form of a U-shaped handle slideably attached to said opposing flat side walls of said housing member for connecting and removing said housing member, said handle having opposing side members terminating with means thereon for opening said latching means to permit connecting of said housing member on said base member, and for opening said latching means to permit removal of said housing member, said latching means being actuated and said housing member being connected or removed by unilateral motion of said handle.

7. A device for connecting and disconnecting an electrical unit or canister having multiple pin connectors to and from a base member of an electrical apparatus and latching same in place comprising in combination a metal housing member having at least two opposing side walls which are substantially flat and parallel and enclosing said electrical unit, latching means in the form of a U-shaped spring mounted between said base member and a panel member of said electrical apparatus, said latching means having opposing side members extending away from said panel member and terminating in cam surfaces disposed between tangs extending inwardly from said opposing side members which are biased for latching and securing said housing member by means of said tangs engaging inwardly drawn beads or detents in said housing member, means in the form of a U-shaped handle slideably attached to said opposing flat side walls of said housing member for connecting and removing said housing member, said handle having opposing side members terminating with means thereon for engaging said cam surfaces and opening said latching means to permit connecting of said housing member on said base member, and for opening said latching means to permit removal of said housing member, said latching means being actuated and said housing member being connected or removed by unilateral motion of said handle.

References Cited in the file of this patent

UNITED STATES PATENTS 1,183,734 Keen ________________ May 16, 1916